United States Patent
Kuo et al.

(10) Patent No.: US 9,071,752 B2
(45) Date of Patent: Jun. 30, 2015

(54) SCENE IMAGING METHOD USING A PORTABLE TWO-CAMERA OMNI-IMAGING DEVICE FOR HUMAN-REACHABLE ENVIRONMENTS

(71) Applicant: National Chiao Tung University, Hsinchu (TW)

(72) Inventors: Yu-Tung Kuo, Kaohsiung (TW); Wen-Hsiang Tsai, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 385 days.

(21) Appl. No.: 13/626,607

(22) Filed: Sep. 25, 2012

(65) Prior Publication Data

US 2014/0085408 A1 Mar. 27, 2014

(51) Int. Cl.
*H04N 7/00* (2011.01)
*H04N 7/18* (2006.01)
*H04N 5/232* (2006.01)
*G06T 3/00* (2006.01)
*G08B 13/196* (2006.01)

(52) U.S. Cl.
CPC .. *H04N 5/23238* (2013.01); *G06T 2207/30232* (2013.01); *G08B 13/19628* (2013.01); *G06T 3/0062* (2013.01)

(58) Field of Classification Search
CPC ............... G06T 3/4038; G06T 3/0062; G06T 2207/30232; G06T 7/0048; H04N 5/2628; G08B 13/19641; G08B 13/19628; G01B 11/2513; G01B 11/2545
See application file for complete search history.

(56) References Cited

U.S. PATENT DOCUMENTS 6,118,474 A * 9/2000 Nayar .............................. 348/36
7,176,960 B1 * 2/2007 Nayar et al. ............. 348/207.99

(Continued)

FOREIGN PATENT DOCUMENTS

TW M 373507 2/2010
TW M 407861 7/2011

(Continued)

OTHER PUBLICATIONS

"Using Pano-mapping tables for unwarping of omni-images into panoramic and perspective-vew images," by Jeng and Tsai, IET IMage Process., 2007, 1, (2), pp. 149-155.*

(Continued)

*Primary Examiner* — Y Lee
*Assistant Examiner* — Shadan E Haghani
(74) *Attorney, Agent, or Firm* — Muncy, Geissler, Olds & Lowe, P.C.

(57) ABSTRACT

A scene imaging method using a portable two-camera omni-imaging device for human-reachable environments is disclosed. Firstly, an upper omni-image and a lower omni-image of at least one scene are captured. Next, image inpainting and image dehazing perform on the upper omni-image and the lower omni-image. Next, image unwrapping performs on the upper omni-image and the lower omni-image by a pano-mapping table, so as to form an upper panoramic image and a lower panoramic image respectively, and the upper panoramic image and the lower panoramic image respectively have an upper part and a lower part overlapping each other. Finally, a data item on the upper part and the lower part is obtained by view points of the scene and the pano-mapping table, thereby stitching the upper and lower panoramic images.

7 Claims, 13 Drawing Sheets

(56) References Cited

U.S. PATENT DOCUMENTS

2006/0187305 A1* 8/2006 Trivedi et al. .................. 348/169
2007/0223911 A1* 9/2007 Yoon et al. .................... 396/323

FOREIGN PATENT DOCUMENTS

| | | |
|---|---|---|
| TW | I 347125 | 8/2011 |
| TW | M 410678 | 9/2011 |
| TW | 201200960 | 1/2012 |

OTHER PUBLICATIONS

"A New 3D IMaging System Using a Portable Two-Camera Omni-Imaging Device for Construction and Browsing of Human-Reachable Environments," by Kuo and Tsai, G. Bebis et al. (Eds.): ISVC 2011, Part I, LNCS 6938, pp. 484-495, 2010.*

L. Vincent, "Taking Online Maps Down to Street Level", Dec. 2007, pp. 118-120, vol. 40 No. 12, IEEE Computer.

Z. Huaibin, et al., "3D reconstruction of an urban scene from synthetic fish-eye images", Proceedings of $4^{th}$ IEEE Southwest Symposium on Image Analysis and Interpretation, Apr. 2000, pp. 219-223, Austin Texas, USA.

A. Roman, "Multiperspective Imaging for Automated Urban Imaging.", Doctoral dissertation, 2006, 96 pages, Dept. Electrical Eng., Stanford University.

A. Rav-Acha, et al., "Minimal aspect distortion (MAD) mosiacing of long scenes", International Journal of Computer Vison, Jul. 2008, pp. 187-206, vol. 78 No. 2-3.

J. Kopf, et al., "Street Slide: browsing street level imagery", ACM Transactions on Graphics, Jul. 2010, pp. 96:1-96:8, vol. 29 No. 4.

Yu-Tung Kuo, et al., "A New 3D Imaging System Using a Portable Two-camera Omni-imaging Device for Construction and Browsing of Human-reachable Environments", $7^{th}$ International Symposium on Visual Computing (ISVC'11), Sep. 27, 2011, pp. 484-495.

* cited by examiner upper omni-image lower omni-image

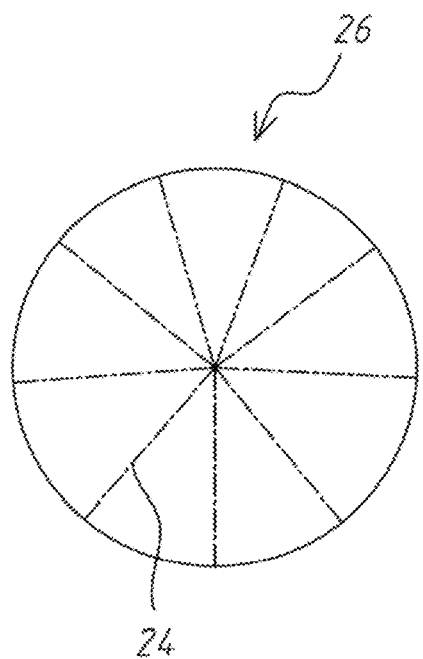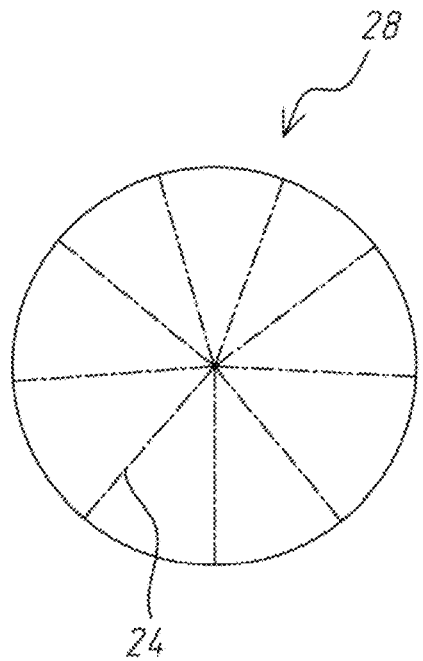
Fig. 5(a)   Fig. 5(b)
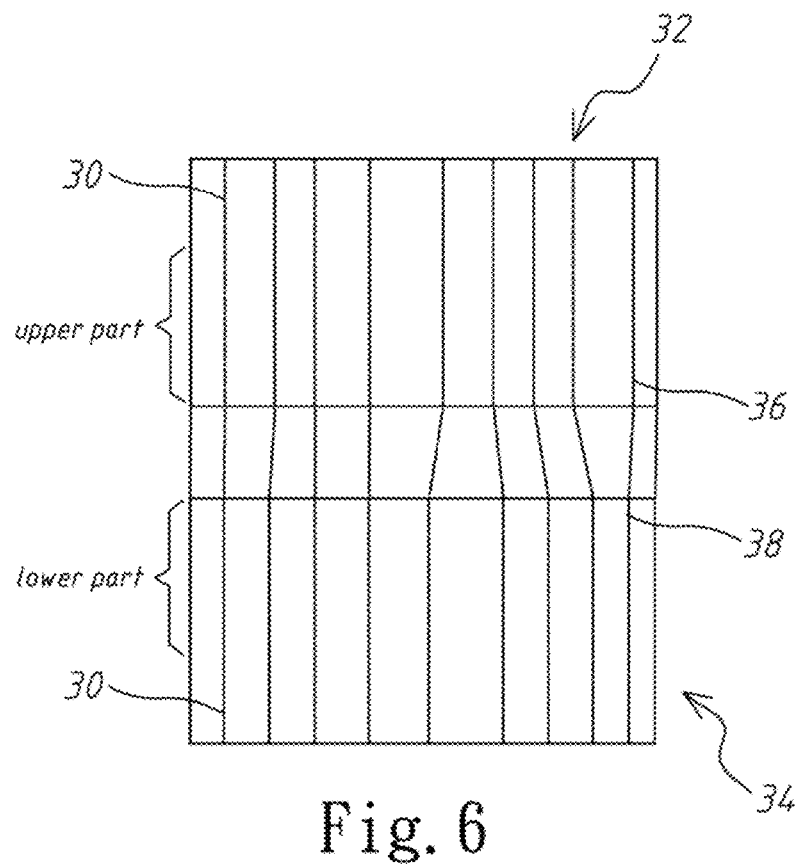
Fig. 6

SCENE IMAGING METHOD USING A PORTABLE TWO-CAMERA OMNI-IMAGING DEVICE FOR HUMAN-REACHABLE ENVIRONMENTS

BACKGROUND OF THE INVENTION

1. Field of the Invention

The present invention relates to an imaging method, particularly to a scene imaging method using a portable two-camera omni-imaging device for human-reachable environments.

2. Description of the Related Art

In recent years, many street view systems have been developed. To exploit a certain street scene, one may just browse a street view system to see the scene online without going there. This provides great value to applications like city touring, real estate sales, environmental management, etc. To collect street scenes, Google Street View Cars were used. To enter narrow lanes, a Street View Trike was designed later. Also launched was a Street View Snowmobile for use on rough terrains. Aboard each of these vehicles is an imaging device with eight digital cameras, one fish-eye camera, and three laser range finders for scene collection. The device weighs about 150 kg.

Though the use of the Street View Trek overcomes the incapability of the Street View Car in reaching narrow alleys, it is hard for a rider to pedal the heavy tricycle on steep ways. Also, although the Snowmobile has better mobility, it still cannot be ridden to some spaces like indoor stairways, mountains tracks, garden paths, etc. Below are briefly cited some prior arts of the scene imaging method. Among them, the Taiwan patent No. M373507 uses two cameras to capture a scene at different angles, and stitches a plurality of images by calculating setting values of the cameras. Besides, the Taiwan patent No. 201200960 uses a camera to record directions and angles of images in combination with other equipments, wherein the directions and angles are helpful in stitching the images. For the prior arts, processing a large amount of data would result in time delay.

In view of the problems and shortcomings of the prior art, the present invention provides a scene imaging method using a portable two-camera omni-imaging device for human-reachable environments, so as to solve the afore-mentioned problems of the prior art.

SUMMARY OF THE INVENTION

The primary objective of the present invention is to provide a scene imaging method using a portable two-camera omni-imaging device for human-reachable environments, which captures an upper omni-image and a lower omni-image and stitch them. The method uses properties of the omni-imaging device to greatly reduce the image amount for matching in the stitching process, thereby reducing time for the stitching process. Besides, the omni-imaging device has light weight and high mobility, and overcomes the limit for equipments and environments to take images of environments that a person reaches.

To achieve the above-mentioned objectives, the present invention proposes a scene imaging method using a portable two-camera omni-imaging device for human-reachable environments. Firstly, an upper omni-image and a lower omni-image of at least one scene are captured. Next, image inpainting and image dehazing perform on the upper omni-image and the lower omni-image. Next, image unwrapping performs on the upper omni-image and the lower omni-image by a pano-mapping table, so as to form an upper panoramic image and a lower panoramic image respectively, and the upper panoramic image and the lower panoramic image respectively have an upper part and a lower part overlapping each other. Then, a data item on the upper part and the lower part is obtained by a plurality of view points of the scene and the pano-mapping table. Finally, the upper panoramic image and the lower panoramic image are stitched to form a total panoramic image according to the data.

Below, the embodiments are described in detailed in cooperation with the attached drawings to make easily understood the technical contents, characteristics, and accomplishments of the present invention.

BRIEF DESCRIPTION OF THE DRAWINGS

FIGS. 5(a)-5(b) are diagrams schematically showing first matching lines on an upper omni-image and a lower omni-image according to an embodiment of the present invention;

FIG. 6 is a diagram schematically showing second matching lines on an upper panoramic image and a lower panoramic image according to an embodiment of the present invention;

DETAILED DESCRIPTION OF THE INVENTION

As an improvement on conventional street view systems like the Google Map and the Google Earth, which cannot cover some special environment areas, such as indoor space with stairways, mountains with steep roads, gardens or parks with narrow tracks, etc. The present invention uses a portable omni-imaging device, which is light and can be carried by a person on his/her back. The omni-imaging device can be used to take an upper omni-image and a lower omni-image simultaneously. The two images cover respectively the upper and lower hemi-spherical fields of view of the environment with an overlapping image band. In other words, the omni-imaging device with high mobility can overcome the limit for equipments and environments to take images of environments that a person reaches.

Figure 1:
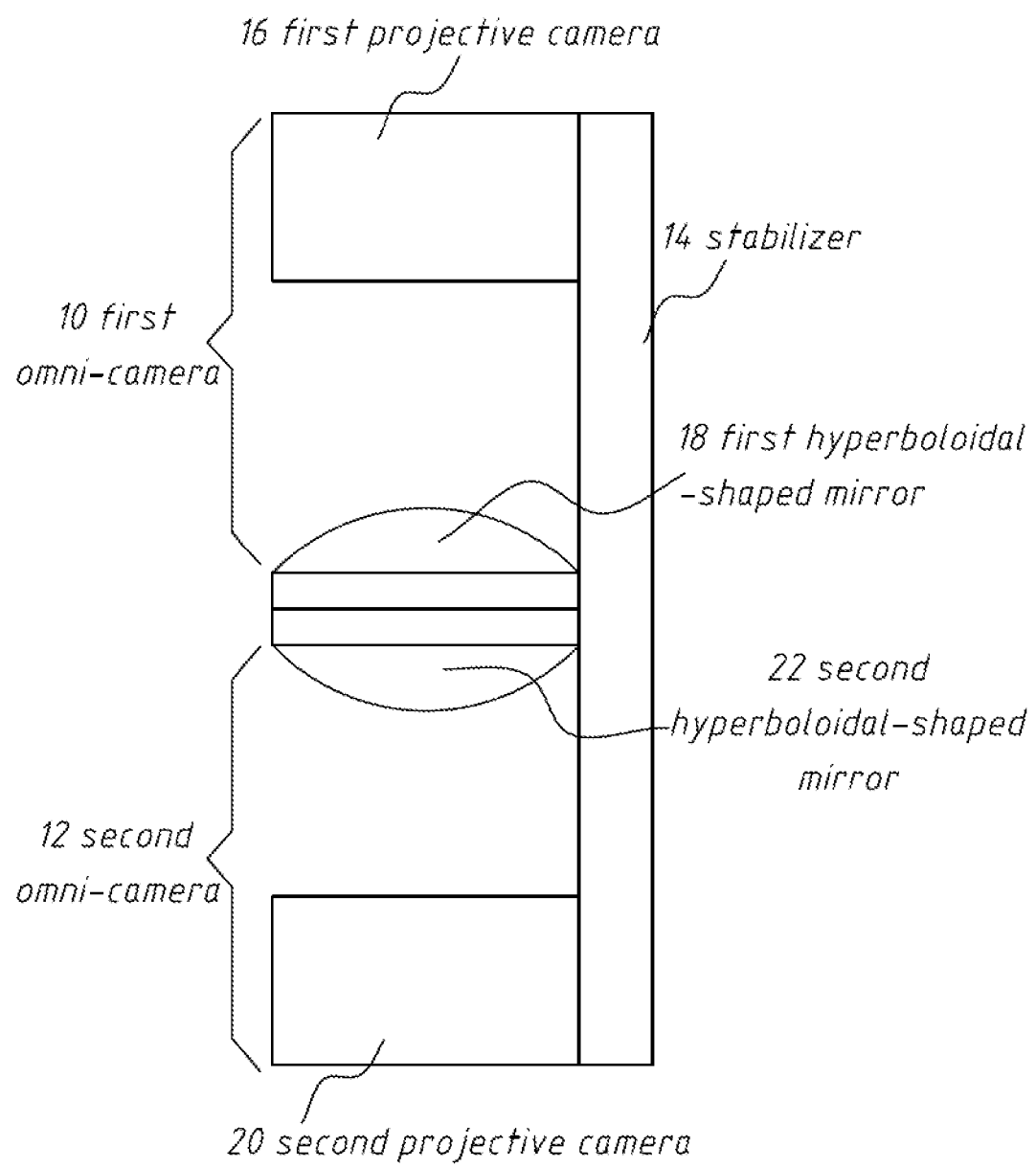
FIG. 1 is a diagram schematically showing an omni-imaging device consisting of a pair of omni-cameras according to an embodiment of the present invention.
Figure 2:
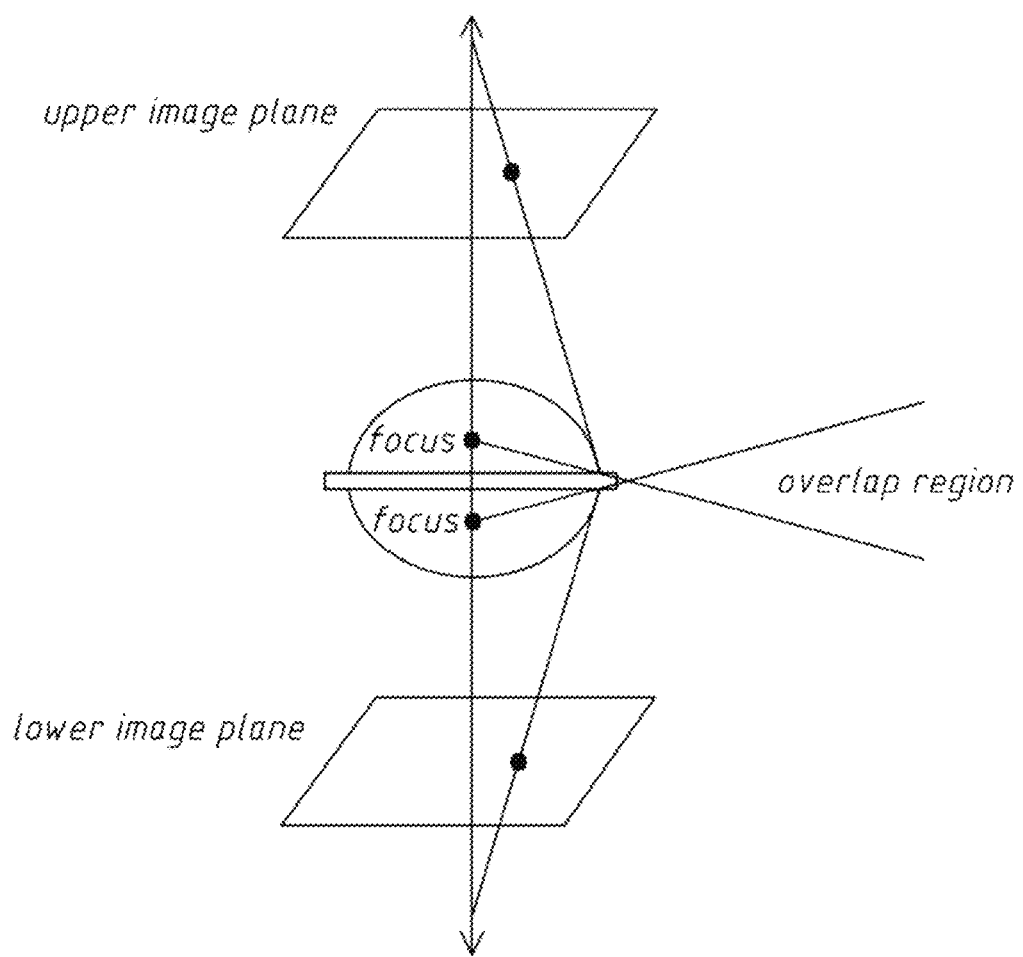
FIG. 2 is a diagram schematically showing an overlapping region produced by the omni-imaging device according to an embodiment of the present invention.

Refer to FIG. 1 and FIG. 2. The present invention, the omni-imaging device, uses a first omni-camera 10 and a second omni-camera 12 aligned coaxially in a back-to-back fashion and disposed on a stabilizer 14. The stabilizer 14 is carried by a person on his/her back to overcome the vibration problem for the first omni-camera 10 and the second omni-camera 12. The first omni-camera 10 comprises a first projective camera 16 and a first hyperboloidal-shaped mirror 18, and the second omni-camera 12 comprises a second projective camera 20 and a second hyperboloidal-shaped mirror 22, and wherein the first hyperboloidal-shaped mirror 18 and the second hyperboloidal-shaped mirror 22 are aligned coaxially in the back-to-back fashion, and the first projective camera 16 is disposed above the first hyperboloidal-shaped mirror 18, and the second projective camera 22 is disposed below the second hyperboloidal-shaped mirror 20. If the mirror bottom plane is designed, as usual, to go through a focal point of the hyperboloidal-shaped of the mirror, then when two omni-cameras of such a design are not connected seamlessly as in the usual case, a circular blind region, which is not observable by either camera, will appear undesirably. Therefore, in the present invention, the mirror bottom plane has to be lower than the focal point as shown in FIG. 2. Moreover, after two cameras with such mirrors are attached back to back, a circular overlapping region will appear in both omni-images as shown in FIG. 2. The overlapping region is helpful in building a total panoramic image.

Figure 3:
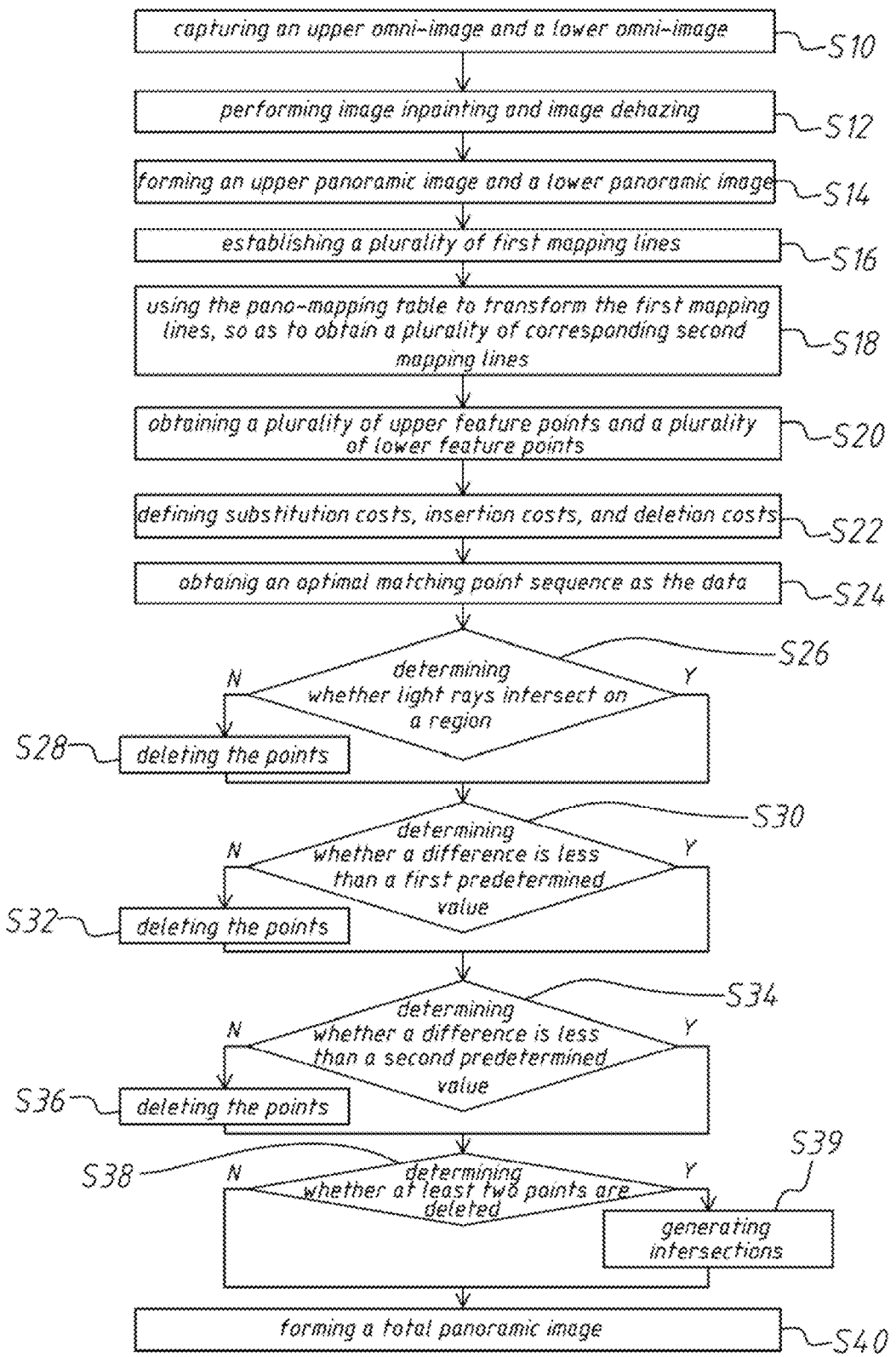
FIG. 3 is a flowchart of forming a total panoramic image according to an embodiment of the present invention.
Figure 4A:
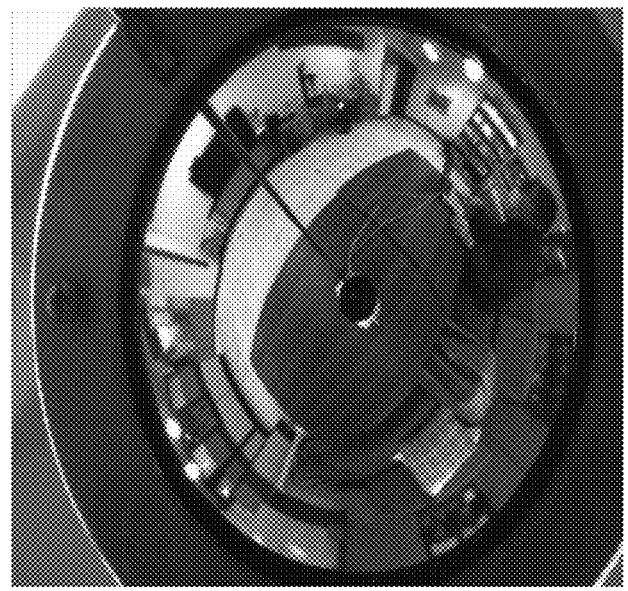
FIGS. 4(a)-4(b) are diagrams schematically showing an upper omni-image and a lower omni-image according to an embodiment of the present invention.
Figure 4B:
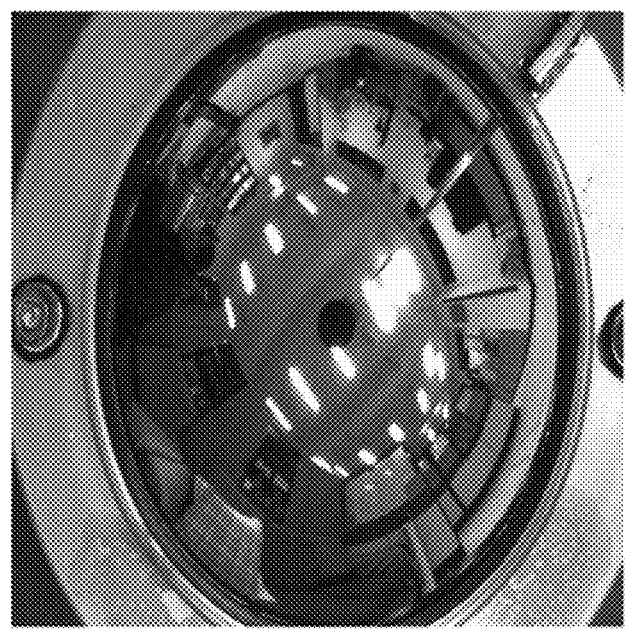

Refer to FIG. 1 and FIG. 3. Firstly, in Step S10, the first omni-camera 10 and the second omni-camera 12 respectively capture an upper omni-image and a lower omni-image of at least one scene. The upper omni-image and the lower omni-image are transmitted to a processor. Next, in Step S12, the processor performs image inpainting and image dehazing on the upper omni-image and the lower omni-image, and the resulted upper and lower omni-images are shown in FIGS. 4(a)-4(b). Next, a pano-mapping table is obtained by the rotation-invariant property (which means that an azimuth angle of a point in space is the same to that of a corresponding image point) of the first omni-camera 10 and the second omni-camera 12, and a relationship between an elevation angle of a projecting point in space and radiuses of mapping points on the first hyperboloidal-shaped mirror 18 and the second hyperboloidal-shaped mirror 22. The pano-mapping table can show a pair of azimuth angle and elevation angle of a real-world point, and coordinates of a mapping point formed by the real-world point on the omni-image. Next, in Step S14, the processor performs image unwrapping on the upper omni-image and the lower omni-image by the pano-mapping table, so as to form an upper panoramic image and a lower panoramic image respectively. The upper panoramic image and the lower panoramic image respectively have an upper part and a lower part overlapping each other. The upper part and the lower part are formed by the overlapping region. According to the optical principle and the space-mapping approach, a light ray of a point in space can form a matching line on the omni-image. Next, in Step S16, the processor establishes a plurality of first matching lines 24 on the upper omni-image 26 and the lower omni-image 28 by a plurality of sight points of the scene and the rotation-invariant property of the first omni-camera 10 and the second omni-camera 12, as shown in FIGS. 5(a)-5(b). Next, in Step S18, the processor uses the pano-mapping table to transform the first matching lines 24, so as to obtain a plurality of corresponding second matching lines 30 on the upper panoramic image 32 and the lower panoramic image 34, and the second matching lines 30 comprise a plurality of second upper matching lines 36 on the upper part and a plurality of second lower matching lines 38 on the lower part, and the second upper matching lines 36 respectively correspond to the second lower matching lines 38, and each second upper matching line corresponds to one view point, as shown in FIG. 6.

Figure 7A:
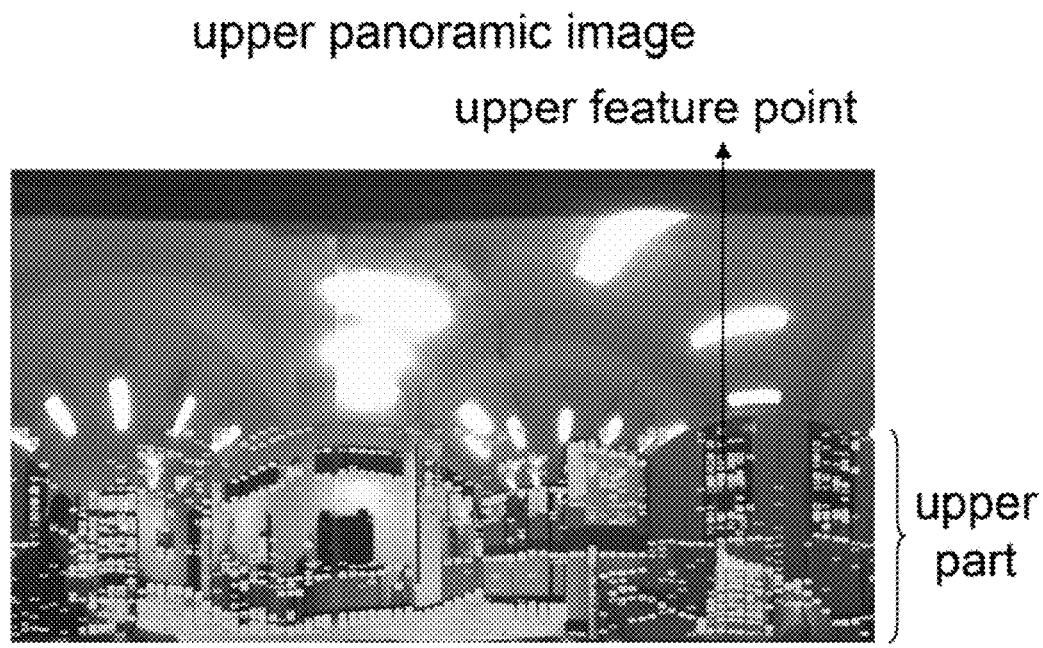
FIGS. 7(a)-7(b) are diagrams schematically showing upper and lower feature points on the upper panoramic image and the lower panoramic image according to an embodiment of the present invention.
Figure 7B:
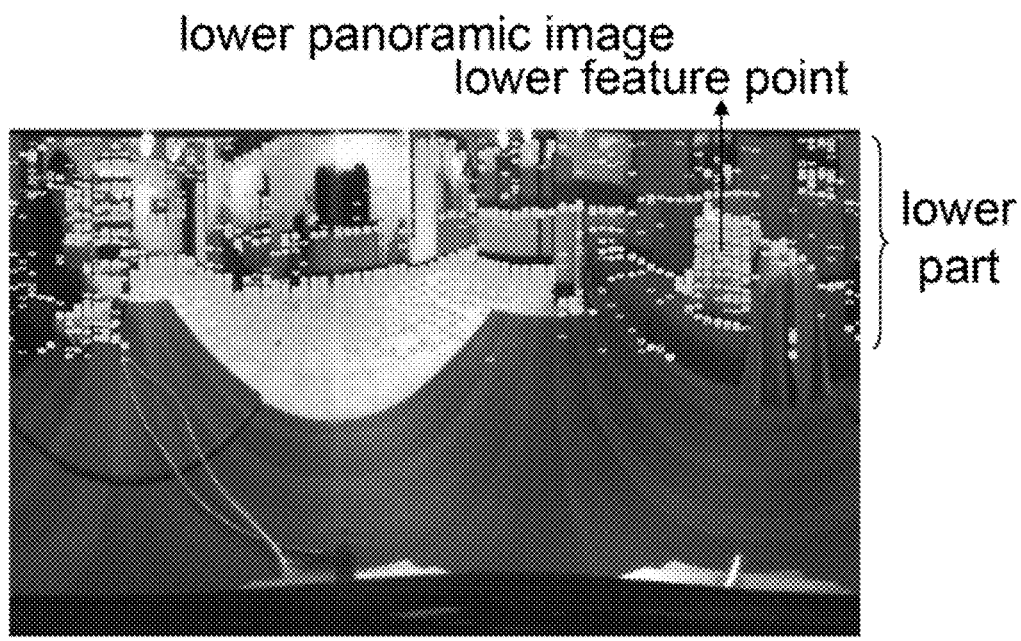

Next, in Step S20, the processor performs edge detection on the second upper matching lines 36 and the second lower matching lines 38, so as to obtain a plurality of upper feature points on the second upper matching lines 36 and a plurality of lower feature points on the second lower matching lines 38, as shown in FIGS. 7(a)-7(b).

Due to differences in noise, distortion, and scaling between the two panoramic images, the feature points appearing in the second upper matching line might not appear in the second lower matching line, and vice versa, resulting in insertions and deletions of feature points in the matching lines. Regarding feature points which match mutually as substitutions. As a result, in Step S22, the processor then defines that the upper feature points and the lower feature points matching each other respectively have substitution costs, and that the upper feature points that the lower feature points don't match respectively have insertion costs, and that the lower feature points that the upper feature points don't match respectively have deletion costs. For example, the substitution cost is expressed by $|H(u)-H(l)|/H_{max}$, wherein $H(u)$ is a hue value of the upper feature point, $H(l)$ is a hue value of the lower feature point, and $H_{max}$ is a maximum hue value, and wherein the insertion cost is 0.5, and the deletion cost is 0.5.

Figure 8A:
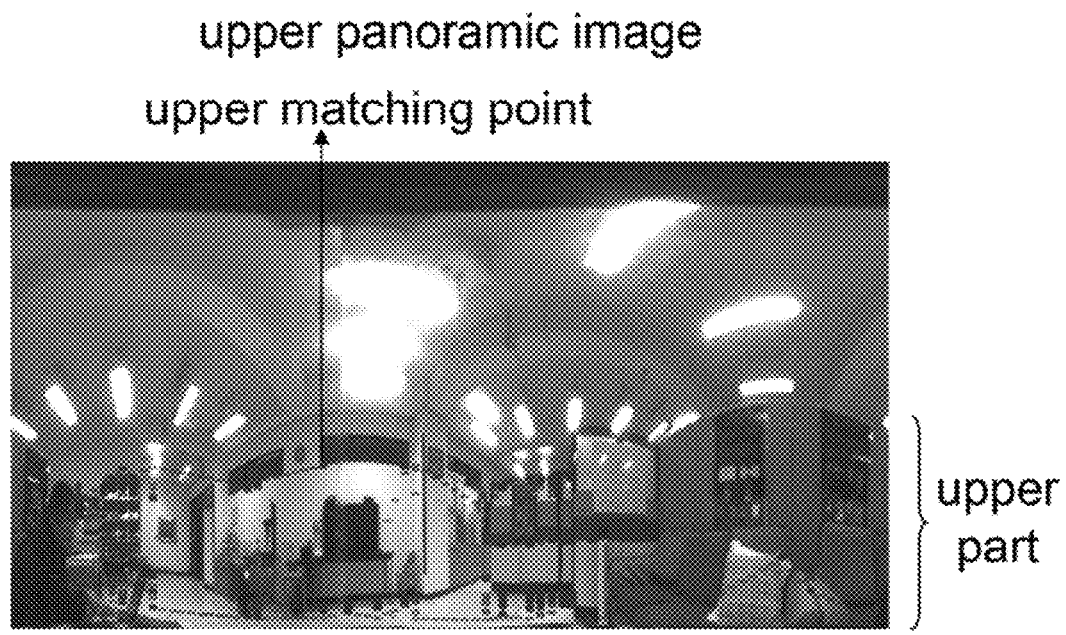
FIGS. 8(a)-8(b) are diagram schematically showing upper and lower matching points on the upper panoramic image and the lower panoramic image according to an embodiment of the present invention.
Figure 8B:
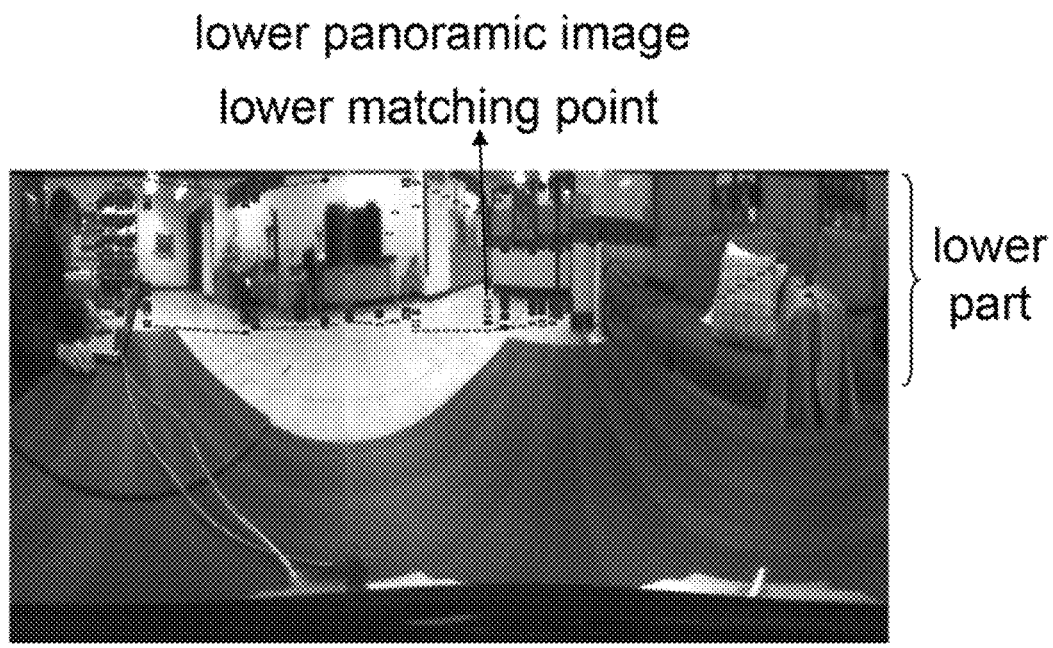

Next, in Step S24, the processor performs the dynamic programming technique on the upper feature points and the lower feature points according the substitution costs, the insertion costs, and the deletion costs, so as to obtain a minimum cost sequence as an optimal matching point sequence, and the optimal matching point sequence comprises parts of the upper feature points and parts of the lower feature points matching each other, and the parts of upper feature points are used as upper matching points, the parts of lower feature points are used as lower matching points, as shown in FIGS. 8(a)-8(b).

Figure 9:
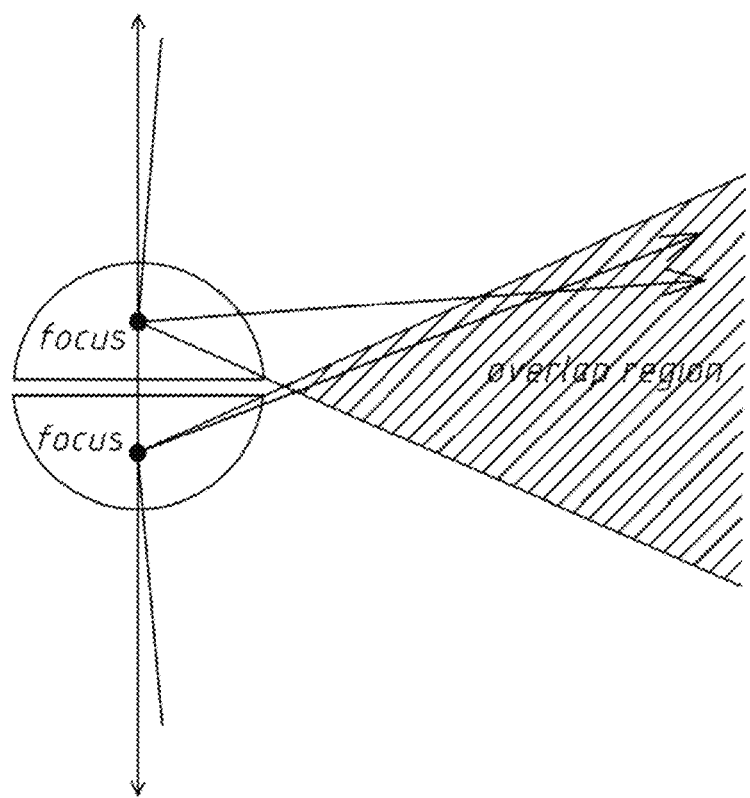
FIG. 9 is a diagram schematically showing the two light rays intersecting on the overlapping region according to an embodiment of the present invention.

Next, in Step S26, the processor determines whether light rays of each upper matching point and each lower matching point matching each other intersect on the region that a first view of the first omni-camera 10 overlaps a second view of the second omni-camera 12. If the answer is no, the process proceeds to Step S28 for deleting the determined upper matching point and the determined lower matching point, and then Step S30 is performed. If the answer is yes, as shown in FIG. 9, the process proceeds to Step S30.

Figure 10:
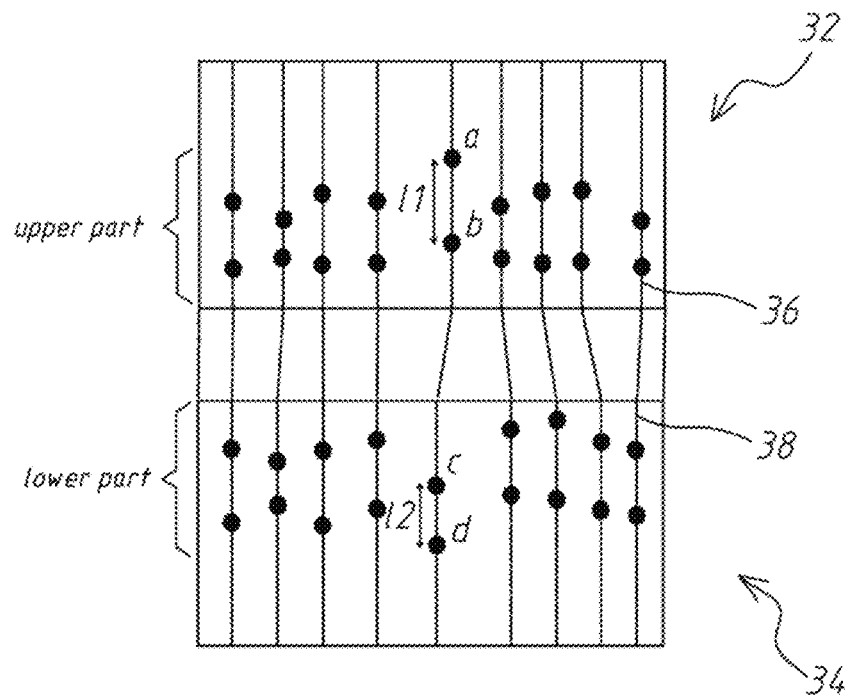
FIG. 10 is a diagram schematically showing the first and second intervals on the upper panoramic image and the lower panoramic image according to an embodiment of the present invention.

As shown in FIG. 10, in Step S30, the processor chooses two upper matching points a and b on the same second upper matching line 36 and two lower matching points c and d on the same second lower matching line 38, which match each other, and determines whether the difference of a first interval 11 and a second interval 12 is less than a first predetermined value, and the first interval 11 is the largest interval between the two upper matching points a and b, and the second interval 12 is the largest interval between the two lower matching points c and d. If the answer is no, the process proceeds to Step S32 for deleting the two upper matching points a and b and the two lower matching points c and d, and then Step S34 is performed. If the answer is yes, the process proceeds to Step S34.

Figure 11:
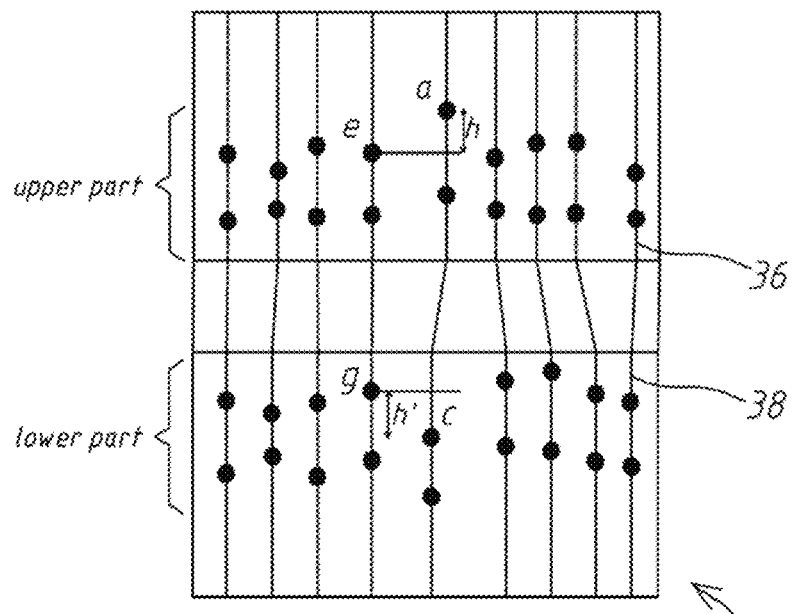
FIG. 11 is a diagram schematically showing the first and second distances on the upper panoramic image and the lower panoramic image according to an embodiment of the present invention.

As shown in FIG. 11, in Step S34, the processor chooses at least two adjacent upper matching points a and e on different second upper matching lines 36 and at least two adjacent lower matching points c and g on different second lower matching lines 38, which match each other, and determines whether the difference of a first distance h and a second distance h' is less than a second predetermined value, and the first distance h is a vertical distance between the two adjacent upper matching points a and e, and the second distance h' is a vertical distance between the two adjacent lower matching points c and g. If the answer is no, the process proceeds to Step S36 for deleting the determined upper matching points corresponding to the first distance h and the lower matching points corresponding to the second distance h', and then Step S38 is performed. If the answer is yes, the process proceeds to Step S38.

Figure 12:
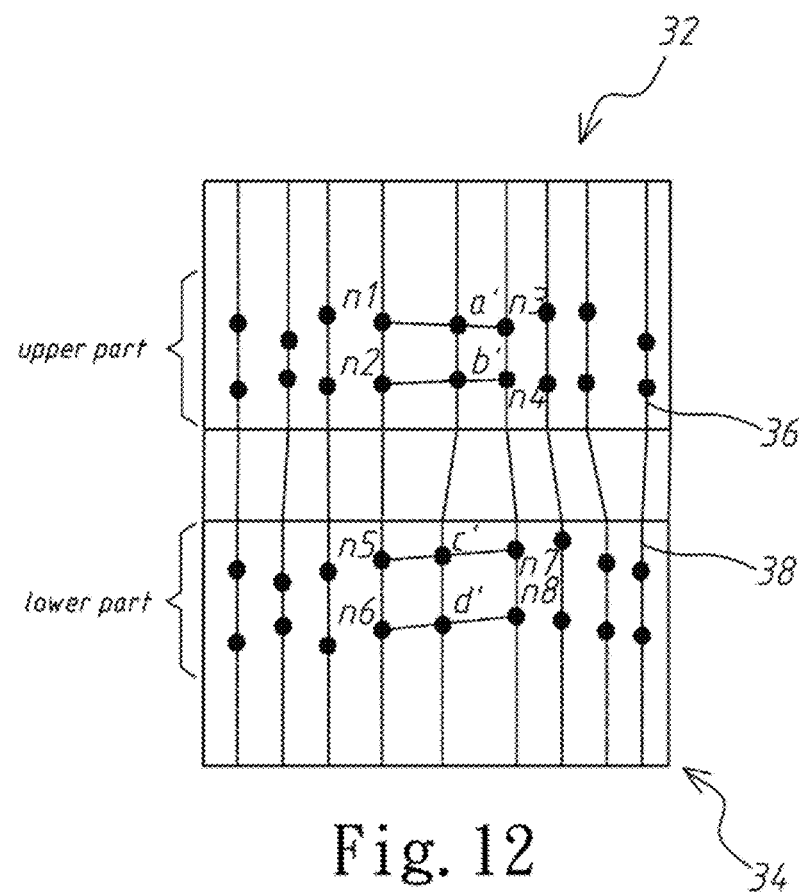
FIG. 12 is a diagram schematically showing the first and second connections on the upper panoramic image and the lower panoramic image according to an embodiment of the present invention.

In Step S38, the processor determines whether at least one upper matching point and at least one lower matching point are deleted. If the answer is no, the upper matching points and the lower matching points are regarded as a data item, and Step S40 is performed. In Step S40, the processor performs the homographic transformation technique to stitch the upper panoramic image and the lower panoramic image to form a total panoramic image according to the upper matching points and the lower matching points on the upper part and the lower part. If the answer is yes, the process proceeds to Step S39. As shown in FIG. 10 and FIG. 12, if the two deleted upper matching points a and b are used as first replaceable matching points, and the two deleted lower matching points c and d are used as second replaceable matching points. In Step S39, the processor chooses two neighboring upper matching points n1 and n3, or n2 and n4 at two sides of the first replaceable matching point a or b and two neighboring lower matching points n5 and n7, or n6 and n8 at two sides of the second replaceable matching point c or d, which match each other, builds a first connection line connecting with the two neighboring upper matching points n1 and n3, or n2 and n4 and intersects one second upper matching line 36 to generate a first intersection a' or b', and builds a second connection line connecting with the two neighboring lower matching points n5 and n7, or n6 and n8 and intersects one second lower matching line 38 to generate a second intersection c' or d'. The above intersections become the new matching points for image stitching. Next, in Step S40, the processor performs the homographic transformation technique to stitch the upper panoramic image and the lower panoramic image to form a total panoramic image according to the remaining upper matching points and the remaining lower matching points on the upper part and the lower part, the first intersection, and the second intersection, which are all used as a data item. Step S39 is used to maintain the matching relationship for the matching lines.

Alternatively, Steps S26-S39 can be replaced with a step of obtaining the data on the upper part and the lower part by the view points of the scene and the pano-mapping table.

Figure 13:
FIG. 13 is a diagram schematically showing a total panoramic image according to an embodiment of the present invention.

And, the total panoramic image of Step S40 is shown in FIG. 13. The present invention uses the dynamic programming technique and the properties of the omni-camera to greatly reduce the image amount for matching in the stitching process, thereby reducing time for the image stitching process.

Figure 14:
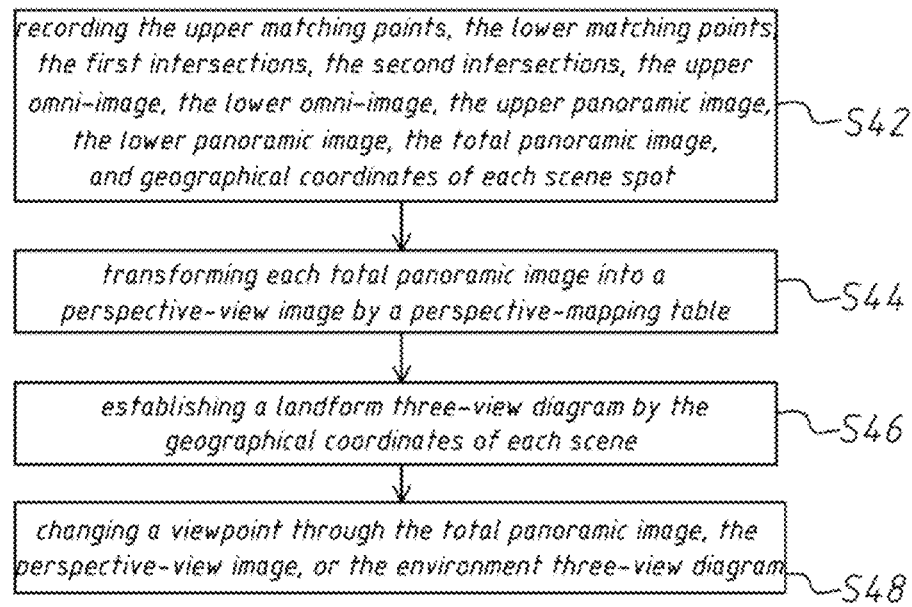
FIG. 14 is a flowchart of establishing a perspective-view image and an environment three-view diagram according to an embodiment of the present invention.

If there is a plurality of scene spot, a process is performed after Step S40, as shown in FIG. 14. In order to dynamically display in a scene browsing system and immediately retrieve the image information, in Step S42, the processor firstly records the upper matching points, the lower matching points, the first intersections, the second intersections, the upper omni-image, the lower omni-image, the upper panoramic image, the lower panoramic image, the total panoramic image, and geographical coordinates of each scene spot, so as to avoid repeating the image process. Next, in Step S44, the processor transforms each total panoramic image into a perspective-view image by a perspective-mapping table in order to browse a real environment image. The perspective-mapping table can generate the perspective-view image for any of directions without complicated computations, so as to achieve the goal of real-time display. Specifically, the entries of perspective-mapping table are recorded by the corresponding coordinates of the pano-mapping table. When a user wants to change the direction of the scene image, the entries of the perspective-mapping table can be shifted to obtain the perspective-view image required according to the changes of azimuth angle and elevation angle. Then, the processor uses optical properties and recording rules for images to calculate the coordinates on the omni-images and the perspective-view image of each scene spot by the geographical coordinates, thereby forming a walking path for browsing. Next, in Step S46, the processor establishes an environment three-view diagram by the geographical coordinates of each scene. The processor is coupled to a display and an operation interface such as a mouse, and transmits the total panoramic image, the perspective-view image, and the environment three-view diagram to the display for showing.

Figure 15:
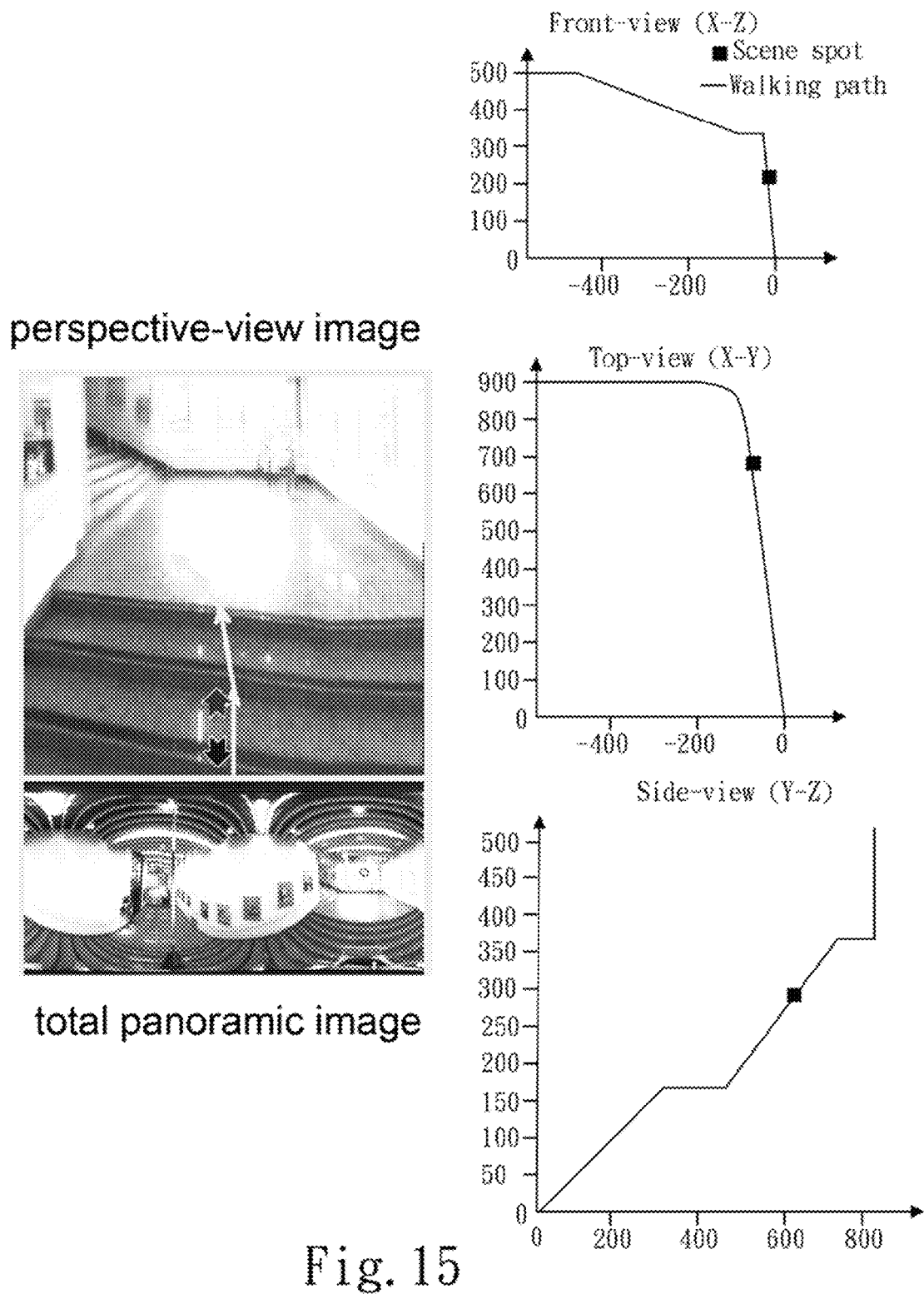
FIG. 15 is a diagram schematically showing the total panoramic image, the perspective-view image and the environment three-view diagram according to an embodiment of the present invention.

Finally, in Step S48, the processor changes a viewpoint through the total panoramic image, the perspective-view image, or the environment three-view diagram. For example, as shown in FIG. 15, the user may navigate the environment further at the current scene spot by 6 ways: (1) changing the viewpoint though the perspective-view image (by clicking and dragging the image to turn into a desired view); (2) changing the viewpoint through the total panoramic image (by clicking a point on the image to select a new view); (3) going forward or backward by navigating the walking path (by clicking on an arrow of the path); (4) going forward or backward step by step on the walking path (by clicking on the arrow); (5) changing the scene spot through the three-view diagram (by clicking on a point any of the three views to see the closest scene spot); (6) zooming in or out the current view (by clicking on the perspective-view image).

In the process of FIG. 14, Step S48 can be omitted whereby the display effect of the present invention is also achieved.

The present invention has several merits: (1) it is light to carry to any indoor/outdoor place; (2) it can be used to collect images in narrow, non-planar, or slanted paths where existing street view vehicles cannot navigate; (3) only two omni-images are acquired to construct various images for each scene spot; (4) perspective-view images can be generated for scene observation from any view direction; (5) six ways of environment browsing via a perspective-view image, a panoramic image, a walking path, and a three-view diagram are provided.

In conclusion, the present invention can greatly reduce the image amount and time for the image stitching process, and take images of environments that a person can reach.

The embodiments described above are only to exemplify the present invention but not to limit the scope of the present invention. Therefore, any equivalent modification or variation according to the shapes, structures, characteristics and spirit of the present invention is to be also included within the scope of the present invention.

What is claimed is:

1. A scene imaging method using a portable two-camera omni-imaging device for human-reachable environments, which is processed by a processor, comprising steps of:

a two-camera omni-imaging device consisting of a first omni-camera and a second omni-camera respectively capturing an upper omni-image and a lower omni-image of at least one scene;

performing image inpainting and image dehazing on said upper omni-image and said lower omni-image;

performing image unwrapping on said upper omni-image and said lower omni-image by a pano-mapping table, so as to form an upper panoramic image and a lower panoramic image respectively, and said upper panoramic image and said lower panoramic image respectively have an upper part and a lower part overlapping each other;

obtaining a data item on said upper part and said lower part by a plurality of view points of said scene and said pano-mapping table; and stitching said upper panoramic image and said lower panoramic image to form a total panoramic image according to said data, wherein said first omni-camera and said second omni-camera are aligned coaxially in a back-to-back fashion, and said step of obtaining said data by said view points and said pano-mapping table further comprises steps of:

establishing a plurality of first matching lines on said upper omni-image and said lower omni-image by said view points;

using said pano-mapping table to transform said first matching lines, so as to obtain a plurality of corresponding second matching lines on said upper panoramic image and said lower panoramic image, and said second matching lines comprise a plurality of second upper matching lines on said upper part and a plurality of second lower matching lines on said lower part, and said second upper matching lines respectively correspond to said second lower matching lines, and each said second upper matching line corresponds to one said view point;

performing edge detection on said second upper matching lines and said second lower matching lines, so as to obtain a plurality of upper feature points on said second upper matching lines and a plurality of lower feature points on said second lower matching lines;

defining that said upper feature points and said lower feature points matching each other respectively have substitution costs, and that said upper feature points that said lower feature points don't match respectively have insertion costs, and that said lower feature points that said upper feature points don't match respectively have deletion costs;

performing dynamic programming technique on said upper feature points and said lower feature points according said substitution costs, said insertion costs, and said deletion costs, so as to obtain a minimum cost sequence as an optimal matching point sequence, and said optimal matching point sequence comprises parts of said upper feature points and parts of said lower feature points matching each other, and said parts of said upper feature points are used as upper matching points, said parts of said lower feature points are used as lower matching points;

determining whether light rays of each said upper matching point and each said lower matching point matching each other intersect on a region that a first view of said first omni-camera overlaps a second view of said second omni-camera:

if no, deleting determined said upper matching point and determined said lower matching point, and then executing a step of choosing two said upper matching points on same said second upper matching line and two said lower matching points on same said second lower matching line, which match each other; and if yes, executing the step of choosing two said upper matching points on same said second upper matching line and two said lower matching points on same said second lower matching line, which match each other;

determining whether a difference of a first interval and a second interval is less than a first predetermined value, and said first interval is a largest interval between said two said upper matching points, and said second interval is a largest interval between said two said lower matching points:

if no, deleting said two said upper matching points and said two said lower matching points, and then executing a step of choosing at least two adjacent said upper matching points on different said second upper matching lines and at least two adjacent said lower matching points on different said second lower matching lines, which match each other; and if yes, executing the step of choosing at least two adjacent said upper matching points on different said second upper matching lines and at least two adjacent said lower matching points on different said second lower matching lines, which match each other;

determining whether a difference of a first distance and a second distance is less than a second predetermined value, and said first distance is a vertical distance between said two adjacent said upper matching points, and said second distance is a vertical distance between said two adjacent said lower matching points:

if no, deleting determined said upper matching points corresponding to said first distance and said lower matching points corresponding to said second distance, and then executing a step of determining whether at least one said upper matching point and at least one said lower matching point are deleted; and if yes, executing the step of determining whether at least one said upper matching point and at least one said lower matching point are deleted; and as a result of the step of determining whether at least one said upper matching point and at least one said lower matching point are deleted, if no, regarding said upper matching points and said lower matching points as said data; and if yes, with deleted said upper matching point being used as a first replaceable matching point and deleted said lower matching point being used as a second replaceable matching point, choosing two neighboring said upper matching points at two sides of said first replaceable matching point and two neighboring said lower matching points at two sides of said second replaceable matching point, which match each other, and building a first connection line connecting with said two neighboring said upper matching points and intersecting one said second upper matching line to generate a first intersection, and building a second connection line connecting with said two neighboring said lower matching points and intersecting one said second lower matching line to generate a second intersection, and regarding said upper matching points and said lower matching points on said upper part and said lower part, said first intersection, and said second intersection as said data.

2. The scene imaging method using the portable two-camera omni-imaging device for human-reachable environments according to claim 1, wherein said first omni-camera comprises a first projective camera and a first hyperboloidal-shaped mirror, and said second omni-camera comprises a second projective camera and a second hyperboloidal-shaped mirror, and wherein said first hyperboloidal-shaped mirror and said second hyperboloidal-shaped mirror are aligned coaxially in said back-to-back fashion, and said first projective camera is disposed above said first hyperboloidal-shaped mirror, and said second projective camera is disposed below said second hyperboloidal-shaped mirror.

3. The scene imaging method using the portable two-camera omni-imaging device for human-reachable environments according to claim 2, wherein said pano-mapping table is obtained by rotation-invariant property of said first omni-camera and said second omni-camera, and a relationship between an elevation angle of a projecting point in real-world space and radiuses of mapping points on said first hyperboloidal-shaped mirror and said second hyperboloidal-shaped mirror.

4. The scene imaging method using the portable two-camera omni-imaging device for human-reachable environments according to claim 1, wherein said substitution cost is expressed by $|H(u)-H(l)|/H_{max}$, and wherein $H(u)$ is a hue value of said upper feature point, $H(l)$ is a hue value of said lower feature point, and $H_{max}$ is a maximum hue value, and wherein said insertion cost is 0.5, and said deletion cost is 0.5.

5. The scene imaging method using the portable two-camera omni-imaging device for human-reachable environments according to claim 1, wherein in said step of establishing said first matching lines by said view points, said first matching lines are established by said view points and rotation-invariant property of said first omni-camera and said second omni-camera.

6. The scene imaging method using the portable two-camera omni-imaging device for human-reachable environments according to claim 1, wherein said at least one scene is a plurality of scene spot, said method further comprising steps of:
   recording said upper matching points, said lower matching points, said first intersections, said second intersections, said upper omni-image, said lower omni-image, said upper panoramic image, said lower panoramic image, said total panoramic image, and geographical coordinates of each said scene spot;
   transforming each said total panoramic image into a perspective-view image by a perspective-mapping table; and
   establishing an environment three-view diagram by said geographical coordinates of each said scene.

7. The scene imaging method using the portable two-camera omni-imaging device for human-reachable environments according to claim 6, further comprising a step of changing a viewpoint through said total panoramic image, said perspective-view image, or said environment three-view diagram.

* * * * *